July 12, 1955
R. B. MADDOCK
2,712,931
APPARATUS FOR RECOVERING SILVER
Filed April 16, 1951
2 Sheets-Sheet 1
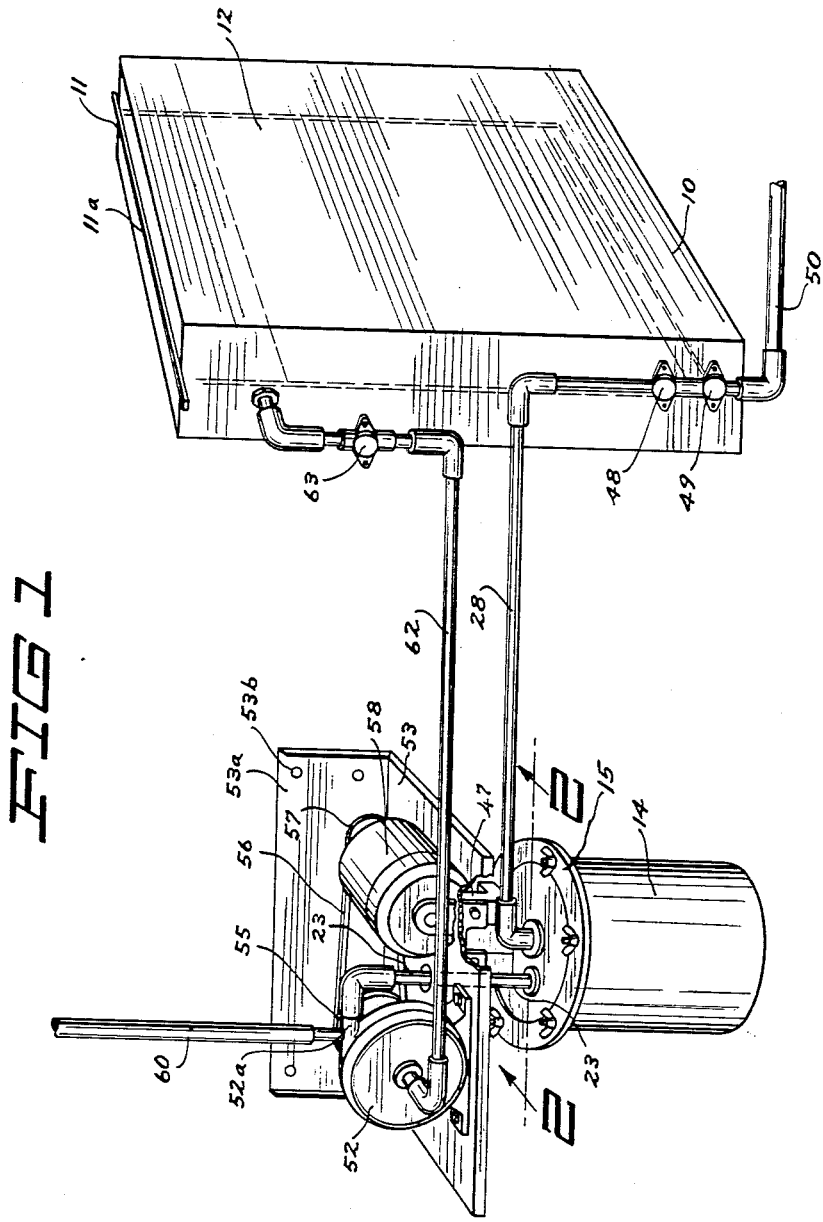
INVENTOR.
RALPH B. MADDOCK
BY
Chas. C. Reif
ATTORNEY.

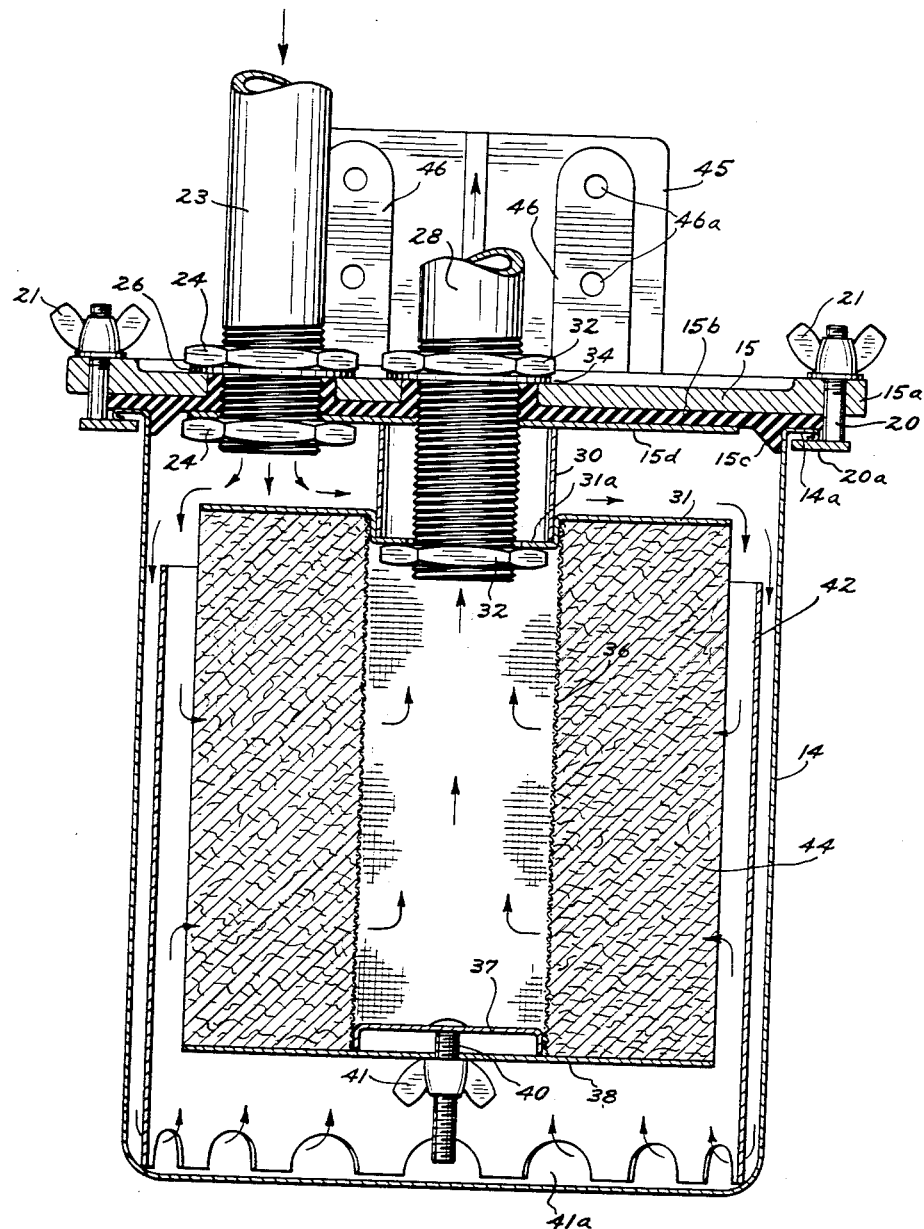

United States Patent Office 2,712,931
Patented July 12, 1955

2,712,931

APPARATUS FOR RECOVERING SILVER

Ralph B. Maddock, Minneapolis, Minn., assignor to Pako Corporation, Minneapolis, Minn., a corporation of Delaware Application April 16, 1951, Serial No. 221,189

5 Claims. (Cl. 266—22)

This invention relates to an apparatus for recovering silver from a used photographic fixing solution, such as the well known and common hypo or thiosulphate solution. As is well known, the fixing solution dissolves out the silver compounds which have not been developed in the photographic films or plates. It is desirable to recover the silver from these used fixing solutions.

It is an object of this invention therefore to provide a novel and efficient apparatus for recovering such silver.

It is a further object of the invention to recover metallic silver from a photographic fixing solution, which solution is in use and in which developed plates, films, or printing papers are disposed, without destroying the usefulness of said solution or interfering with its fixing function.

It is another object of the invention to continuously recover the silver from a photographic fixing solution, which solution is in use and in which developed films, or plates, or printing papers may be immersed without interfering with the normal function of said fixing solution and at the same time renewing the fixing activity of said solution and prolonging the active life thereof.

It is still another object of the invention to provide an apparatus for recovering silver from a photographic fixing solution which is being used and in which developed light sensitive photographic sheets may be immersed, which consists in circulating said solution to bring the same into contact with aluminum metal thereby precipitating metallic silver and forming some soluble aluminum salts, recovering the silver by passing said solution through a filter and then returning the solution to said container whereby said fixing solution is renewed, its active life greatly prolonged, and the same is benefited by the said aluminum salts which have a hardening effect on the emulsion of said films or plates so that the usual replenishing of said solution by the addition of fresh solution is greatly reduced.

It is also an object of this invention to provide an efficient apparatus by means of which a used silver-laden hypo solution in a container may be restored to activity by conducting it from said container, removing the silver, filtering said solution and returning it with desirable chemical compounds to said container.

It is a further object of this invention to provide an efficient apparatus for effecting an exchange of the silver ions in a used photographic fixing bath, such as a hypo bath, with another metal, thus securing resultant ions which have a beneficial or rejuvenating effect on one or more of the ingredients of said solution.

It is an object of this invention to provide an apparatus for treating a photographic fixing solution, such as a hypo solution, having in combination, a container in which said solution is carried, a member of aluminum metal, a filter, means for conducting said solution from said container into contact with said member, passing said solution through said filter and returning the same to said container.

It is another object of this invention to provide an apparatus for treating a photographic fixing solution, such as a hypo solution, having in combination, a container in which said solution is carried, a member of metal higher in the electromotive series than silver, a filter, and means for conducting said solution from said container into contact with said member, for passing said solution through said filter and for returning the same to said container.

It is more specifically an object of this invention to provide an apparatus for treating a used photographic fixing solution, such as a hypo solution having in combination, a container in which said solution is carried and in which developed photographic films or plates may be disposed for fixing, a second container, a member made of metal which is higher than silver in the electromotive series, said metal preferably being aluminum, which member has quite a large surface disposed in said second container, a filter disposed in said second container preferably made of chemically inactive fibrous material, a pump, means for operating said pump, a conduit connected to the inlet side of said pump and extending to and communicating with said first mentioned container, a second conduit connected to the outlet side of said pump and extending to and communicating with said second container for directing fluid into contact with said member, a third conduit extending from said second container and communicating therewith at a side of said filter opposite that at which said member is disposed, said third conduit extending to and communicating with said first mentioned container whereby said solution is pumped from said first mentioned container to said second container, into contact with said member and through said filter and back to said first mentioned container.

These and other objects and advantages of the invention will be fully set forth in the following description made in connection with the accompanying drawings in which like reference characters refer to similar parts throughout the several views and in which:

Fig. 1 is a perspective view of the apparatus of this invention; and

Fig. 2 is a vertical section taken substantially on line 2—2 of Fig. 1, as indicated by the arrows.

Referring to the drawings, a container 10 is shown, and while this might be of any suitable form, in the embodiment of the invention illustrated it is shown as box-like in form or rectangular in horizontal and vertical cross section. The container 10 is adapted to contain a photographic fixing solution, such as a hypo solution or hyposulphitic liquid for fixing exposed photographic plates or films. A film holder 11 is shown having a supporting rod 11a which extends across the open top of container 10 and to which is attached a photographic film 12 which will be disposed in the fixing solution in container 10. A second container 14 is shown, and while this could be variously formed, in the embodiment of the invention illustrated it is shown as a cylindrical metal container, the same being shown as having a flat bottom and an open top, said container being turned outwardly substantially at 90 degrees at its top to form a peripheral top flange 14a, the terminal edge portion of which is reversely bent inwardly. A cover 15 is provided for container 14, and while this could take various forms, the same is illustrated as comprising a plate 15a preferably made of metal, which is somewhat greater in diameter than the container 14, said plate having disposed therebelow a gasket 15b preferably made of rubber or some rubber compound, said gasket having its outer edge portion resting on the top flange 14a and being provided with a depending annular portion 15c substantially fitting against the inner side of the wall of container 14. A thin plate 15d is disposed below gasket 15b held in place by means to be later described. A plurality of circumferentially spaced holding members 20 are provided having cylindrical shanks extending through the outer edge portion of plate 15a and having arms 20a at their lower ends adapted to be turned to a position disposed under the flange 14a and also to be turned to a position 180 degrees from said first mentioned position so that they will be clear of the flange 14a. The shanks of member 20 are threaded at their upper end portions and have thumb nuts 21 threaded thereon. A conduit or tube 23 extends through cover 15 and has an open end communicating with container 14. The lower end portion of conduit 23 is threaded and nuts 24 are threaded thereon the lower of which is disposed below and engages plate 15d and the upper of which engages a washer 26 in turn engaging the top of plate 15a. Plate 15d is thus held against the bottom of gasket 15b by the nuts 24. Gasket 15b has an integral sleeve extending upwardly through plate 15a and about conduit 23. A second conduit 28 extends through cover 15, the same extending downwardly some distance in container 14 and having a lower open end. A cylindrical shell 30 surrounds the lower portion of conduit 28, the same engaging the bottom of plate 15d at its upper end and the inner offset portion 31a of a plate 31. Plate 31 has a cylindrical portion between its top and its lower or offset portion 31a into which the lower end of shell 30 substantially fits. Conduit 28 is threaded at its lower portion and nuts 32 are threaded thereon, the lower one of which engages the bottom of portion 31a and the upper of which engages a thin washer 34 which in turn engages the top of plate 15a. Portions 30 and 31 are thus clamped to the cover 15. Gasket 15b has an integral sleeve extending about conduit 28 and through an opening in plate 15a. A screen of perforated tube 36 is disposed in container 14, the same at its upper end substantially fitting about the cylindrical portion of plate 31 and at its bottom fitting about the periphery of a cup-like plate 37, said plate 37 having a depending rim, and this rim and the lower portion of screen 36 engage the top of a plate 38 which is of substantially the same diameter as plate 31. A threaded stem 40 is secured centrally to plate 37, as by riveting, and depends therefrom, the same having threaded thereon a thumb nut 41 which engages the bottom of plate 38. Screen 36 is thus held or clamped between the plates 38 and 31. A member 42 is provided which will be made of a metal which is higher in the electromotive series than silver and said member preferably is made of aluminum. While member 42 could take various shapes or forms, in the embodiment of the invention illustrated it is shown as in the form of a cylindrical shell having a diameter somewhat smaller than the diameter of container 14. Member 42 is disposed centrally of member 14 and there is thus an annular space between the periphery of member 42 and the wall of container 14. Member 42 rests on the bottom of container 14 and is provided at its lower edge portion with a multiplicity of substantially semi-circular openings 41a. Member 42 may have a high specific surface for a rapid reaction of precipitating the silver or a relatively small specific surface to slow down the reaction of precipitation of silver, thereby controlling the rate of reaction of silver metal precipitation. A filter 44 is provided, and while this could be variously formed, in the embodiment of the invention illustrated it is shown as of annular cylindrical form, the same extending between plates 31 and 38 and being of substantially the same diameter as said plates so that the same has a cylindrical periphery which is spaced a short distance inwardly of member 42. While various kinds of filters might be used, in practice filter 44 has been made of a body of compressed fiberglass filaments or fibers. Said filter is thus made of a chemically inactive fibrous material. Cover 15 has secured to its plate 15a a plate 45 and a pair of upstanding lugs 46 engaging the same, said lugs and plate being provided respectively with holes 46a adapted to receive securing screws or bolts for attaching said cover to a support 47 which may be carried on member 53.

Referring to Fig. 1, it will be seen that conduit 28 extends horizontally some distance above cover 15 and extends to and is connected to the lower portion of container 10. Said conduit 28 is provided with a valve 48 and is also provided with a valve 49 for controlling its connection to a drain conduit 50. The conduit 23 extends to the outlet portion 52a of a rotary pump 52 shown as supported upon a bracket 53 which has a vertical portion 53a provided with a plurality of holes 53b for receiving attaching screws for attaching said bracket to a suitable support. Pump 52 is provided with a driving pulley 55 over which runs a belt 56 also running over a pulley 57 secured to the driving shaft of an electric motor 58 also mounted on bracket 53. Container 14 is also secured to bracket 53 or to a bracket 47 thereon by attaching screws (not shown) passing through the holes 46a. A portion of the cover 15 is shown as being disposed under the horizontal portion of bracket 53. A vent tube 60 is secured to and communicates with the outlet portion 52a of pump 52 and is shown as extending vertically for quite a distance, the same having an open upper end. A conduit 62 extends from the inlet portion of pump 52 to the upper portion of container 10, the same being equipped with a valve 63.

The method and apparatus of this invention can be used to treat a photographic fixing solution which is in use and in which developed plates or films are immersed. Such a solution is shown in container 10. In operation the fixing solution will be circulated by pump 52 from the upper portion of container 10, through conduit 62, through conduit 23 to container 14. As stated, member 42 is made of aluminum. It may be stated that in practice container 14 and the plates 15d, 30, 31, 37 and 38 have been made of stainless steel. Of course said members could be made of any material suitable for use with photographic liquids. The solution is directed to the member 42, a large portion of the same passing to the outer side of member 42 and between the same and the wall of container 14, which portion then passes through the openings 41a and moves upwardly. Another portion moves down along the inside of member 42 and engages the inner surface thereof. When the silver-laden hypo engages the aluminum member 42 a reaction takes place which precipitates metallic silver. Most of this silver drops to the bottom of vessel 14. Said reaction also results in the formation of aluminum salts, such as aluminum chloride and aluminum sulphate, some of which are insoluble. After the engagement of the solution with member 42 the same passes inwardly through the filter 44. Any metallic silver carried in the solution will be collected in the filter 44. The filter 44 also filters out any insoluble salts which have been formed and filters out any extraneous particles which are carried in the solution. The filtered solution passes through screen 36 and upwardly in conduit 28 and is moved by the circulation caused by pump 52 to the bottom portion of container 10 where it again joins and mixes with the fixing solution in said container. Pump 52 is of course driven from motor 58 through belt 56. With the apparatus functioning as described, valve 63 will be open as will also valve 48. Valve 49 will be closed. The solution returned to container 10 has its fixing activity renewed or restored so that the solution in container 10 is kept at a high degree of activity and the active life of the solution in container 10 is greatly prolonged. The soluble aluminum salts are carried with the solution and returned to container 10 and these with other chemicals in the solution have a beneficial effect on the fixing solution. The aluminum salts function to act as a hardener for the emulsion on the films or plates being treated. This fact and the fact that the solution is rejuvenated or has its fixing quality resored makes it unnecessary to add much fresh replenishing solution to container 10. It is customary in photographic establishments to at intervals add a certain quantity of fresh solution to the fixing bath. When the present method is used only a small part, if any, replenishing fluid is necessary. When a certain amount of silver has collected in container 14 it can be very easily disconnected by loosening the thumb nuts 21 and swinging the arms 29a to release the same. Said container can then be lowered and removed and the precipitated silver taken therefrom. The precipitated silver and filter 44 may be washed with dilute hydrochloric acid and the residue smelted, resulting in a very high purity of metallic silver.

The vent tube 60 is provided to let any gas which may collect in the top of pump 52 escape. There is some gas produced and this tends to collect in the top portion of the pump. This might make it necessary to prime the pump when again starting the same. By letting the gas escape through the vent tube such priming is not necessary.

The method and apparatus can be used to recover silver from a fixing solution which has been used to the limit of its usefulness and is to be discarded. In such a case container 10 would represent the container in which said discarded solution was contained. After all silver was recovered in container 14, valve 49 would then be opened and the solution would pass through drain conduit 50 to any desired receptacle. Valve 48 would be closed, shutting off the communication of conduit 28 with container 10.

From the above description it will be seen that I have provided a method and apparatus by means of which silver can be recovered continuously from the fixing bath which is being used and by means of which the fixing bath will have its activity renewed and its active life much prolonged. The efficiency of the fixing bath is thus kept at a high point. This is a great advantage as in the practice heretofore used, the fixing bath degenerates in activity and fresh solution must be added at intervals. The fixing bath finally is discarded. Much better fixing results can thus be obtained when the present method is used and the proper fixing attained in a shorter time.

It is believed that applicant is the first to treat a photographic fixing solution with a metal which is higher than silver in the electromotive series and then to filter the solution to remove the silver and other substances which are not soluble in the solution, while simultaneously fixing photographic films or plates in such a solution and performing these functions without adding products harmful to the fixing solution. The method and apparatus of course can be used to great advantage in treating a used fixing solution which has been discarded from use for the purpose of recovering the silver. The weight of metallic silver recovered is theoretically twelve times the weight of the aluminum used. While the amount of silver recovered will of course vary with the condition of the used fixing solution, in practice approximately 145 grains of silver have been recovered from five gallons of the used solution. Substantially all of the silver is recovered. The reaction and the precipitation of silver will continue as long as the silver halides of the plates or films are being dissolved in the fixing bath and of course as long as there is aluminum metal present in container 14. It is important that the solution first contact the aluminum before it is passed through the filter. There is no adverse or injurious effect to the fixing solution in container 10 caused by the solution returned from the filter.

The method and apparatus have been amply demonstrated in actual practice, found to be highly successful and efficient, and its comercial production is being started.

It will of course be understood that various changes may be made in the form, details, arrangement and proportions of the apparatus and in the steps and sequence of steps of the method without departing from the scope of applicant's invention, which, generally stated, consists in a method and apparatus capable of carrying out the objects above set forth, such as disclosed and defined in the appended claims.

What is claimed is:

1. An apparatus for recovering silver from a photographic fixing solution having in combination, a container in which said solution is disposed, a second container, a member of aluminum metal disposed in said second container and extending about and spaced from the wall thereof, a reticulate tube at the central portion of said second container, a filter between said tube and said member and spaced a short distance from said member, a removable cover for said second container, a conduit extending through said cover and extending to the top of said tube, said conduit extending to said first mentioned container, a pump, a second conduit extending through said cover at one side of said first mentioned conduit and extending to the outlet side of said pump, and a third conduit extending from the inlet side of said pump to said first mentioned container whereby said solution can be continuously pumped from said first mentioned container to said second container and into contact with said member, through said filter and back to said first mentioned container.

2. The structure set forth in claim 1, said first mentioned conduit being connected to said first mentioned container adjacent the bottom thereof, and said third mentioned conduit being connected to said first mentioned container adjacent the top thereof.

3. An apparatus for recovering silver from a photographic fixing solution having in combination, a container in which said solution is disposed, a second substantially cylindrical container, a substantially cylindrical member of aluminum disposed in said second container and extending about and spaced from the wall thereof, a perforated tube disposed centrally of said second container, a filter disposed between said tube and said member and spaced a short distance from said member, a tube extending from the top of said tube adapted to be connected to said first mentioned container, a pump, a third conduit connected to the top of said second container communicating therewith and extending to the outlet side of said pump, and a fourth conduit connected to the inlet side of said pump and extending to and being connected to said first mentioned container whereby said solution can be continuously pumped from said first mentioned container to said second container and into contact with said member, through said filter and back to said first mentioned container.

4. The structure set forth in claim 3, said filter being composed of a closely contiguous mass of chemically inactive fibers.

5. The structure set forth in claim 3, said filter being formed of a compressed mass of fiberglass filaments.

References Cited in the file of this patent

UNITED STATES PATENTS

| | | |
|---|---|---|
| 834,803 | Hendryx | Oct. 30, 1906 |
| 837,832 | Hendryx | Dec. 4, 1906 |
| 901,124 | Ross | Oct. 13, 1908 |
| 951,372 | Judd | Mar. 8, 1910 |
| 1,866,701 | Garbutt et al. | July 12, 1932 |
| 2,079,597 | Allingham | May 11, 1937 |
| 2,194,056 | Quaglia | Mar. 19, 1940 |
| 2,204,898 | Lee et al. | June 18, 1940 |

FOREIGN PATENTS

| | | |
|---|---|---|
| 680,865 | Germany | Sept. 9, 1939 |

OTHER REFERENCES

Liddell: "Handbook of Nonferrous Metallurgy," Recovery of the Metals, pub. by McGraw-Hill Book Co., Inc., New York, N. Y. (1945), page 326.